United States Patent [19]

Notake et al.

[11] Patent Number: 5,187,620

[45] Date of Patent: Feb. 16, 1993

[54] HEAD POSITION DETERMINATION CONTROL APPARATUS OF DATA RECORDING/REPRODUCING APPARATUS IN A DATA SURFACE SERVO SYSTEM

[75] Inventors: Yuichi Notake, Tokyo; Kenji Asai; Tomihisa Ogawa, both of Oome, all of Japan

[73] Assignee: Kabushiki Kaisha Toshiba, Kawasaki, Japan

[21] Appl. No.: 472,670

[22] Filed: Jan. 30, 1990

[30] Foreign Application Priority Data

Jan. 31, 1989 [JP] Japan ................................. 1-21010
Mar. 28, 1989 [JP] Japan ................................. 1-76061

[51] Int. Cl.$^5$ ............................................. G11B 5/596
[52] U.S. Cl. .............................. 360/77.04; 360/77.05
[58] Field of Search ........................... 360/77.04, 77.05

[56] References Cited

U.S. PATENT DOCUMENTS 4,371,960  2/1983  Kroiss ............................ 360/77.04
4,974,109  11/1990  Hoshimi et al. ................ 360/77.04
4,982,295  1/1991  Yakuwa et al. ................. 360/77.04

FOREIGN PATENT DOCUMENTS 0238318  9/1987  European Pat. Off. ......... 360/77.04

OTHER PUBLICATIONS

IBM Tech. Disc. Bulletin, vol. 17, No. 6, Nov. 1974 "Correction of Data Track Misregistration in Servo Controlled . . .", A. Paton, pp. 1781–1783.

Commander, et al., "Servo Design for an Eight-Inch Disk File," IBM Disk Storage Technology, pp. 89–97 (Feb. 1980).

*Primary Examiner*—Joseph L. Dixon
*Assistant Examiner*—David L. Robertson
*Attorney, Agent, or Firm*—Finnegan, Henderson, Farabow, Garrett and Dunnar

[57] ABSTRACT

In a composite servo system or a servo system using only a sector servo system, when a head switching mode is set during a read/write operation, a CPU checks whether the cylinder of a target track of a subsequent head after switching is the same as that of a target track of a preceding head. If the target tracks are located on the same cylinder, the CPU compares offset value data of a data surface corresponding to the head before switching with that of the head after switching. If an error, as a comparison result, falls within a predetermined allowable range, a read/write operation by the head after switching is continuously executed. The CPU generates correction data used for positional correction processing for positioning the head at the center of the target position of a hard disk and temporarily stores the correction data in a data memory. The CPU executes positional correction processing on the basis of the correction data stored in the data memory.

2 Claims, 5 Drawing Sheets

HEAD POSITION DETERMINATION CONTROL APPARATUS OF DATA RECORDING/REPRODUCING APPARATUS IN A DATA SURFACE SERVO SYSTEM

BACKGROUND OF THE INVENTION

1. Field of the Invention

The present invention relates to a head position determination control apparatus used in a data recording/reproducing apparatus such as a hard disk unit.

2. Description of the Related Art

In a conventional hard disk unit, a plurality of recording media are axially arranged at predetermined intervals. Part of one recording medium constitutes a servo surface, on which servo data necessary for servo control of a magnetic head is recorded, and all other recording media constitute data surfaces. The magnetic head consists of a plurality of data heads corresponding to the respective data surfaces, and a servo head corresponding to the servo surface.

In a dedicated servo system, each data head is sought to a target track of a corresponding data surface, in accordance with servo data recorded on the servo surface and read therefrom by the servo head, and is positioned at the center of the target track by position determination control. In contrast to such a dedicated servo system as described above, a composite servo system using both a dedicated servo system and a data surface servo system has been developed. Since this composite servo system makes use of servo data recorded on the servo surface and servo data recorded on part of each data surface, each data head can be positioned on a target track of a corresponding data surface with high precision. More specifically, in the above composite servo system, the incidence of positioning errors caused by a thermal offtrack phenomenon—i.e. a data head positioning error vis-a-vis a corresponding surface, due to changes in the ambient temperature of the hard disk unit—can be reduced. The thermal offtrack phenomenon is known, in which a positioning error of each data head on a corresponding data surface occurs due to changes in ambient temperature of the hard disk unit. Since, in the composite servo system, servo data relating to each data surface can be obtained, therefore position determination control can be performed in respect of each data surface. However, when the system is placed in a head switching mode (a mode in which the read/write operation is switched from a first data head to a second data head), head position determination control must be performed anew when the second data head is to access the same target track as was previously accessed by the first data head. In contrast, in the dedicated servo system, when a read/write operation is to be performed with respect to different data surfaces of the same cylinder, the read/write operation executed in a continuous manner, without the need for fresh head position determination control to be performed after the head switching mode is executed.

As systems for recording servo data on the data recording surface, there are a sector servo system in which the servo data is recorded in the individual sectors of the data track, an EMBEDED servo system in which the servo data is recorded for every several sectors in the respective tracks, an index servo system in which only one servo data is recorded in each of the tracks, and the like. Hereinafter, the system for recording the servo data on the data recording surface is provisionally called a data surface servo system. In such data surface servo system, the servo data cannot be continuously obtained. For this reason, when positional correction is performed by using the data surface servo data, servo data of, e.g., several sectors are required. The positions of the heads on the respective data surfaces do not always coincide with each other due to the thermal offtrack phenomenon. Therefore, when heads are switched, head positioning must be controlled again. In order to set a head in an ontrack state with respect to a new track, servo data of several sectors must be read to perform positioning. As a result, the time required for position determination control (settling time) is increased.

SUMMARY OF THE INVENTION

It is an object of the present invention to provide a head position determination control apparatus which can shorten a read/write processing time when head switching is executed with respect to a different data surface of an identical cylinder.

It is another object of the present invention to provide a head position determination control apparatus of a data recording/reproducing apparatus, in which the time required for positional correction with respect to a thermal offtrack state in a composite servo system can be shortened to increase an access speed in effect.

According to a first aspect of the present invention, there is provided an apparatus for recording/reproducing information, comprising: a plurality of magnetic recording mediums, one surface of one of said plurality of magnetic recording mediums being a servo surface on which only servo data for magnetic head positioning determination is recorded, and the other surfaces of said magnetic recording mediums excluding the servo surface being data surfaces on which servo data is partly recorded and for recording data; a servo head, provided corresponding to the servo surface, for reading out the servo data from the servo surface; a plurality of data heads, provided corresponding to the respective data surfaces of the respective recording mediums, for reading from or writing data into the corresponding data surfaces; carriage means for mounting said servo head and said data heads, and for moving said servo head and said data heads on said recording mediums; seek control means for moving by said carriage means said data heads to the target track of the respective data surfaces of said corresponding recording mediums based on the servo data read out from the servo surface by said servo head; position offset value detecting means for obtaining the respective position offset values with respect to the center of the target track of the respective data heads based on the servo data recorded on the data surfaces of said recording mediums in order to position to the respective center of the target track the respective data heads which are moved to the target track by said seek control means; memory means for storing respective position correction data used for the position determination processing of said respective data heads based on the position offset values obtained by said position offset value detecting means; position determination control means for positioning, in the center of the target track, by said carriage means, said data heads sought to the target track of the data surfaces, based on the position correction data corresponding to the respective data heads stored in said memory means; determining means for determining whether a cylinder of a track on which a first of said data heads has been positioned is identical to a cylinder of a track on which a second of said data heads is to be positioned, when a data read/write operation for the data surface corresponding to the first data head is switched to a data read/write operation for the data surface corresponding to the second data heads; and control means for, when said determining means determines that the target tracks are located on the same cylinder, comparing the position correction data corresponding to first data head stored in said memory means with the position correction data corresponding to the second data head stored in said memory means, and for executing the data read/write operation by said second data head without executing the respective control operations by said seek control means and said position determination control means when an error as the comparison result falls within a predetermined allowable range.

According to a second aspect of the present invention, there is provided an apparatus for recording/reproducing information, comprising: a plurality of magnetic recording mediums, the respective surfaces thereof being data surfaces on which servo data being partly recorded and for recording recording data; a plurality of data heads, provided corresponding to the respective data surfaces, for reading or writing data to the corresponding data surfaces; carriage means for mounting said data heads and for moving said data heads on the recording mediums; seek control means for moving, by said carriage means, the data heads to the target track of the respective data surfaces corresponding to said data heads based on the servo data read out from the data surfaces by said data heads; position offset value detecting means for obtaining the respective offset values with respect to the center of the target track of said respective data heads based on the servo data recorded on the respective data surfaces, in order to position, in the center of the target track, said data heads sought to the target track of the data surfaces; memory means for storing respective position correction data used for position determination processing of said respective data heads based on the position offset values obtained by said position offset value detecting means; position determination control means for positioning, in the center of the target track, by said carriage means, said data heads sought to be target track of the data surfaces, based on the position correction data corresponding to the respective data heads stored in said memory means; determining means for determining whether a cylinder of a track on which a first of said data heads has been positioned is identical to a cylinder of a track on which a second of said data heads is to be positioned, when a data read/write operation for the data surface corresponding to the first data magnetic head is switched to a data read/write operation for the data surface corresponding to the second data magnetic heads; and control means for, when said determining means determines that the target tracks are located on the same cylinder, comparing the position correction data corresponding to first data head stored in said memory means with the position correction data corresponding to the second data head stored in said memory means, and for executing the data read/write operation by said second data head without executing the respective control operations by said seek control means and said position determination control means when an error as the comparison result falls within a predetermined allowable range.

According to a third aspect of the present invention, there is provided an apparatus for recording/reproducing information, comprising: a plurality of magnetic recording mediums, one surface of one of said plurality of magnetic mediums being a servo surface on which only servo data for magnetic head positioning determination is recorded, and the other surfaces of said magnetic recording mediums excluding the servo surface being data surfaces on which servo data is partly recorded and for recording data; a servo head, provided corresponding to the servo surface, for reading out the servo data from the servo surface; a plurality of data heads, provided corresponding to the respective data surfaces of the respective recording mediums, for reading from or writing data into the corresponding data surfaces; carriage means for mounting said servo head and said data heads, and for moving said servo head and said data heads on said recording mediums; seek control means for moving by said carriage means said data heads to the target track of the respective data surfaces of said corresponding recording mediums based on the servo data read out from the servo surface by said servo head; position offset value detecting means for obtaining the respective position offset values with respect to the center of the target track of the respective data heads based on the servo data recorded on the data surfaces of said recording mediums in order to position to the respective center of the target track the respective data heads which are moved to the target track by said seek control means; memory means for storing the position offset values used for the position determination of said respective data heads based on the position correction data obtained by said position offset value detecting means; and position control means for, when a data read/write operation for the corresponding data surface by a first data head is changed to a data read/write operation for the corresponding data surface by a second data head, positioning said second data head in a center of a target track by said carriage means in accordance with the position correction data stored in said memory means if a predetermined time has not elapsed after the data read/write operation by said second data head for the corresponding surface has previously been performed, and for positioning said second head into the center of the target track by said carriage means in accordance with the position correction data generated based on the servo data read out from the corresponding data surface by said second data head, if a predetermined time has elapsed after the data read/write operation by said second data head has previously been performed.

According to a fourth aspect of the present invention, there is provided an apparatus for recording/reproducing information, comprising: a plurality of magnetic recording mediums, the respective surfaces thereof being data surfaces on which servo data being partly recorded and for recording data; a plurality of data heads, provided corresponding to the respective data surfaces, for reading or writing data to the corresponding data surfaces; carriage means for mounting said data heads and for moving said data heads on the recording mediums; seek control means for moving, by said carriage means, the data heads to the target track of the respective data surfaces corresponding to said data heads based on the servo data read out from the data surfaces by said data heads; position offset value detecting means for obtaining the respective offset values with respect to the center of the target track of respective data surfaces, in order to position, in the center of the target track, said data heads sought to the target track of the data surfaces; memory means for storing respective position correction data used for position determination of said respective data heads based on the position offset values obtained by said position offset value detecting means; and position control means for, when a data read/write operation for the corresponding data surface by a first data head is changed to a data read/write operation for the corresponding data surface by a second data head, positioning said second data head in a center of a target track by said carriage means in accordance with the position correction data stored in said memory means if a predetermined time has not elapsed after the data read/write operation by said second data head for the corresponding surface has previously been performed, and for positioning said second head into the center of the target track by said carriage means in accordance with the position correction data generated based on the servo data read out from the corresponding data surface by said second data head, if a predetermined time has elapsed after the data read/write operation by said second data head has previously been performed.

According to the present invention, when heads are switched to access a data surface different from a previously accessed data surface on the same cylinder, a read/write operation can be continuously executed without performing a new head determination control operation. In addition, when positional correction processing for a thermal offtrack state is to be performed, since correction data stored in the memory is used, processing for generating correction data by reading sector servo system data from a data surface in each operation need not be performed.

DETAILED DESCRIPTION OF THE PREFERRED EMBODIMENTS

Figure 1:
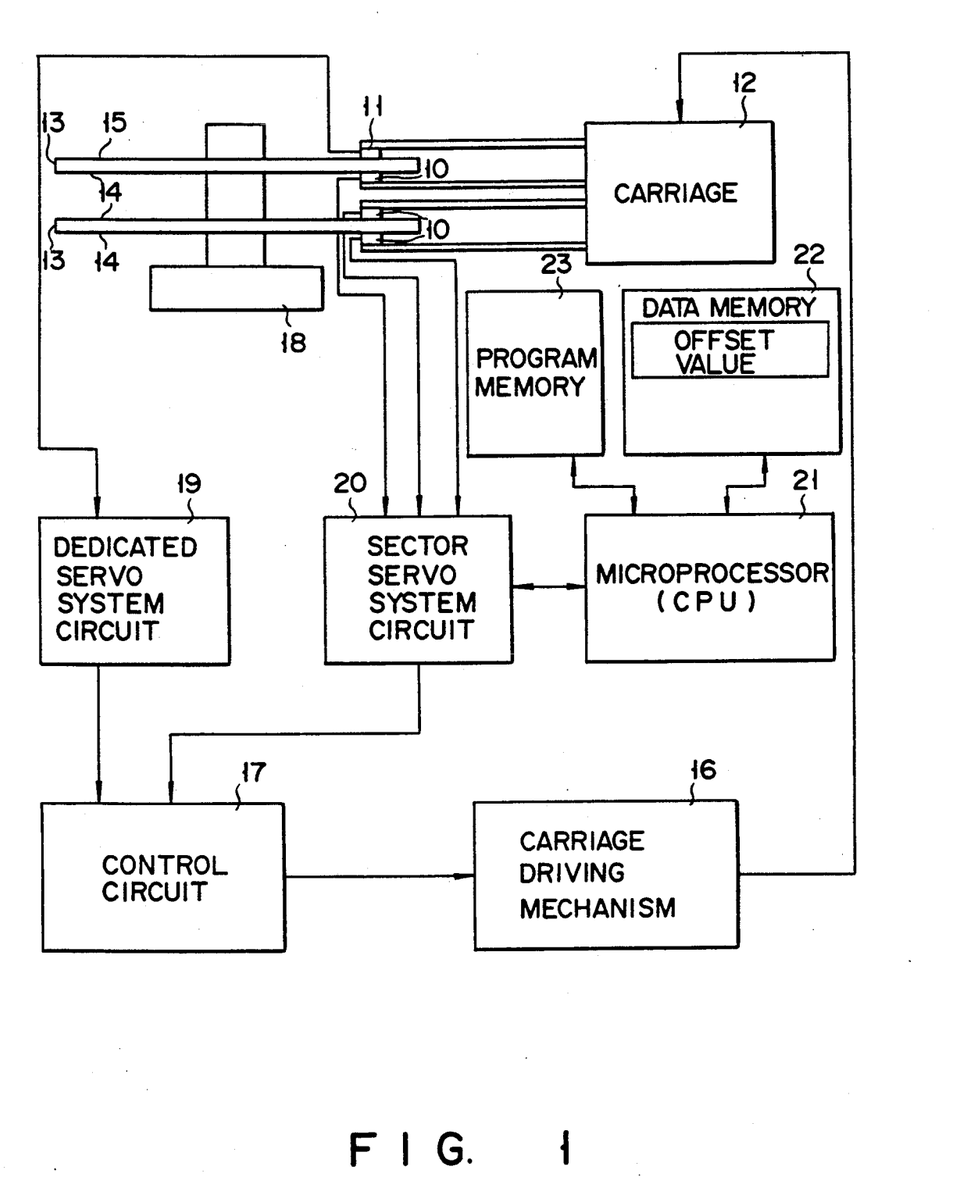
FIG. 1 is a block diagram showing a head position determination control apparatus of a data recording/reproducing apparatus according to an embodiment of the present invention.

FIG. 1 is a block diagram showing an arrangement of a read/write head position determination control apparatus of a hard disk unit. Note that in this embodiment, the sector servo system is used as the data surface servo system. A plurality of data heads 10 and a servo head 11 are mounted on a carriage 12 so as to correspond to a plurality of data surfaces 14 and a servo surface 15 of recording media 13. The carriage 12 is moved by a carriage driving mechanism 16 in the radial direction of the media 13 so as to enable each data head 10 and servo head 11 to access particular data surfaces and a servo surface. The carriage driving mechanism 16 may include, for example, a voice coil motor and is controlled by a control circuit 17. The recording media 13 are rotated by a spindle motor 18. Servo data for seek-controlling each data head 10 to a target track is recorded on the servo surface 15 of the recording medium 13. In addition, servo data necessary for positioning of the heads 10 are respectively recorded on the data surfaces 14 in addition to normal data.

A dedicated servo system circuit 19 generates a head position signal on the basis of servo data read by the servo head 11 and outputs it to the control circuit 17. A sector servo system circuit 20 generates an offset signal on the basis of servo data read by each data head 10 and outputs it to the control circuit 17. The control circuit 17 generates a driving control signal for the carriage 12 on the basis of the head position signal output from the servo system circuits 19 and the offset signal output from the servo system 20 and outputs it to the carriage driving mechanism 16. A microprocessor (CPU) 21, a data memory 22, and a program memory 23 constitute an arrangement as a characteristic feature of the present invention, serving as a circuit for performing position determination control of the data heads 10 with respect to the same cylinder. The data memory 22 stores offset value data. The program memory 23 stores programs shown in FIG. 2 and FIGS. 6A and 6B.

An operation of the embodiment shown in FIG. 1 will be described below.

Figure 2:
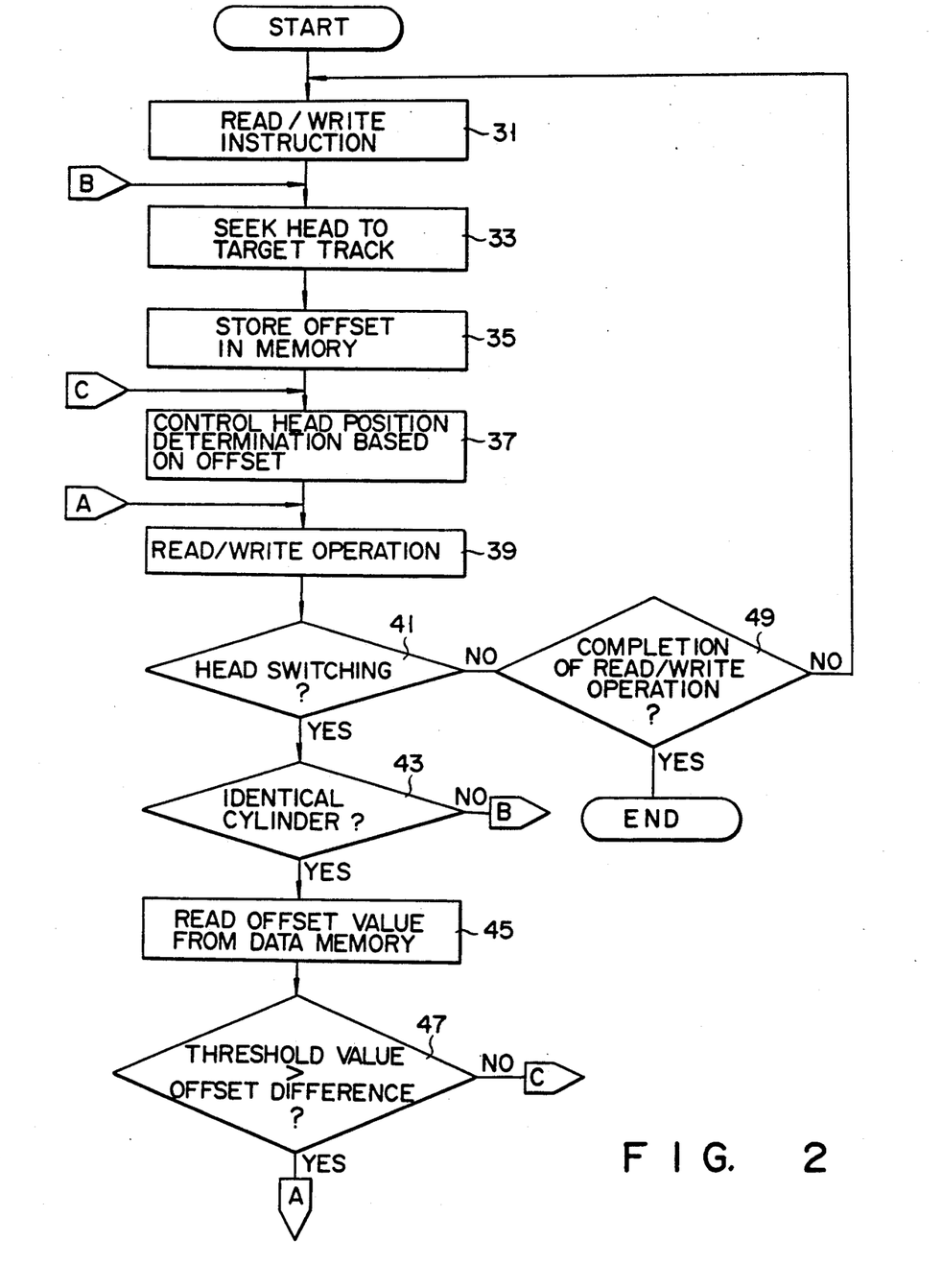
FIG. 2 is a flow chart for explaining an operation of the embodiment in FIG. 1.
Figure 3:
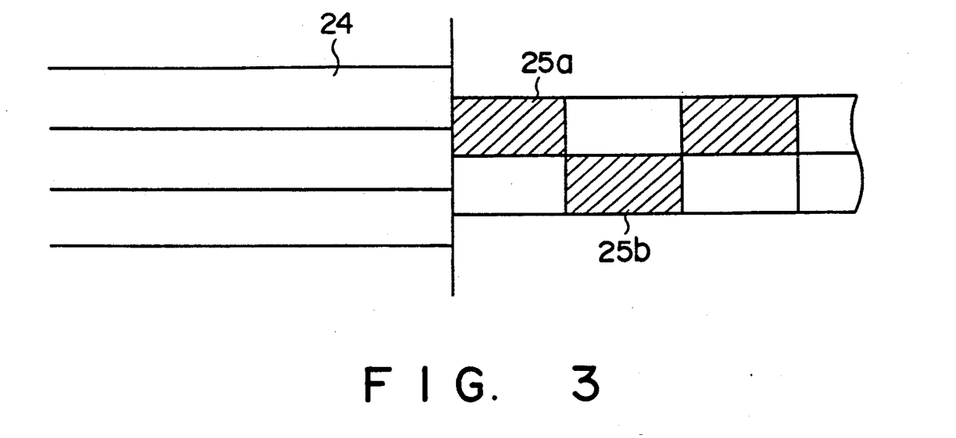
FIGS. 3 through 5 are views for explaining the principle of detection of an offset value.
Figure 4:
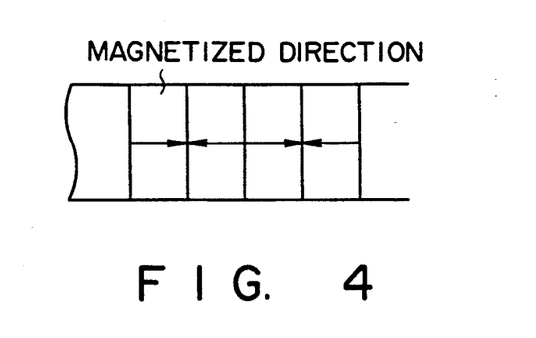
Figure 5:
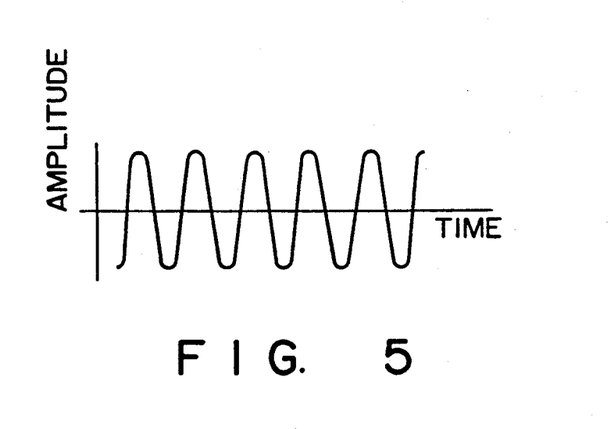

In the composite servo system, when a read/write instruction is output from a host computer (not shown) in step 31 in FIG. 2, seek control is executed so that data head 10 seeks a corresponding data track of data surface 14 in/from which data is to be read/written. In the seek control, the control circuit 17 obtains an error between a speed signal obtained by differentiating a head position signal output from the dedicated servo system circuit 19 and a target speed signal predetermined in accordance with a moving distance to the target track, and outputs a driving control signal corresponding to this speed error to the carriage driving mechanism 16. The carriage driving mechanism 16 drives the carriage 12 on the basis of the driving signal from the control circuit 17 so as to obtain a moving speed corresponding to the target speed. When the selected/designated data head 10 reaches the target track of the corresponding data surface 14 with this operation, position determination control is executed to position the head 10 on the center of the target track. The control circuit 17 outputs the driving control signal to the carriage driving mechanism 16 in accordance with the head position signal output from the dedicated servo system circuit 19 so as to control movement of the carriage 12. In addition, when the offset signal is output from the sector servo system circuit 20 on the basis of the servo data read from the corresponding data surface 14 by the data head 10 to be positioned, the control circuit 17 controls movement of the carriage 12 in accordance with this offset signal (to be referred to as offset value data hereinafter). More specifically, as shown in FIG. 3, data tracks 24 and servo areas (hatched portions) 25 which are respectively offset from the data tracks 24 by a distance which is substantially half the width of a data track. Burst data as head position determination data are recorded in the hatched portions. FIG. 4 is an enlarged view showing the servo regions in FIG. 3. In FIG. 4, arrows indicate magnetized directions. FIG. 5 shows an output waveform read from servo areas by a head. Assuming that a head width is equal to a data track width, when a head is set in an ontrack state, the half of each of servo areas 25a and 25b is read. Since the voltage of the waveform read from the servo area 25a coincides with the voltage of the waveform read from the servo area 25b, the voltage difference is "0". In contrast to this, if a head is set in an offtrack state, the voltage of the waveform read from the servo area 25a differs from that of the waveform read from the servo area 25b, and the voltage difference is detected as an offset value. That is, position determination control of each data head 10 is executed by using both dedicated servo system data and sector servo system data.

In step 35, the CPU 21 receives offset value data generated by the sector servo system circuit 20 and stores it in the memory 22 for each data surface. The offset value data stored is the data memory 22 is updated for every predetermined time. Since this offset value changes in each operation, an offset value is measured and stored in the data memory 22 every time the apparatus is energized. The control circuit 17 controls movement of the carriage 12 through the carriage driving mechanism 16 so as to position the data head 10 on the center of the target track in accordance with the offset value data output from the sector servo system circuit 20 (step 37). When the data head 10 is positioned on the center of the target track, a read/write operation of data is executed (step 39).

When the data surface 14 in/from which data is to be read/written is switched to a new data surface 14, a switching mode of the data heads 10 is executed (step 41). That is, a data head 10 corresponding to the new data surface 14 is selected/designated. At this time, the CPU 21 checks whether the cylinder of a target track in/from which the data head 10 after switching is to read/write data is the same as that of the target track in/from which the data head 10 before switching is to read/write data (step 43). If the cylinders are not the same, seek control and position determination control are executed from step 33 in the same manner as described above.

When the cylinders are the same, the CPU 21 reads out offset value data corresponding to the data head 10 before switching from the data memory 22 (step 45). In addition, the CPU 21 compares the offset value data read out from the memory 22 with offset value data corresponding to the data head 10 after switching. The offset value data corresponding to the data head 10 after switching is an offset signal generated by the sector servo system circuit 20 on the basis of the servo data read from the corresponding data surface 14. If the difference between the respective offset values is less than a threshold value, the control circuit 17 determines that the data head 10 after switching is located at substantially the same position on the cylinder as that of the data head 10 before switching, and executes a high-speed mode control while skipping a position determination control operation (step 47). With this operation, the data head 10 after switching executes a read/write operation for the target track on the same cylinder of the data surface 14 different from the data surface 14 corresponding to the data head 10 before switching. In this case, the threshold value represents the limit value of the allowable range of a positioning error when the data head 10 is positioned on a position of the same cylinder corresponding to the center of the target track.

If the offset value difference is equal to or more than the threshold value, the control circuit 17 performs position determination control for the target track on the basis of the offset value data corresponding to the data head 10 after switching (step 37). This offset value data is stored by the CPU 21 in the memory 22 in the same manner as described above (step 35).

As described above, in the switching mode of the data heads 10, when target tracks in/from which the data heads 10 before and after switching read/write data are located on the same cylinder, if the difference of offset values of heads 10 falls within the allowable range of a positioning error, it is determined that the data head 10 after switching is positioned at the center of the target track on the same cylinder. As a result, the high-speed mode control for immediately performing a read/write operation is executed while skipping a position determination control operation for the data head after switching. Therefore, in the read/write processing by means of the data head 10 after switching, the processing time can be shortened by a time required for a position determination control operation.

The above embodiments has been described by exemplifying a magnetic disk apparatus where the dedicated servo system and the data surface servo system are combined as the servo system. The present invention can also be applied to a magnetic disk apparatus where only the data surface servo system is used.

Figure 6A:
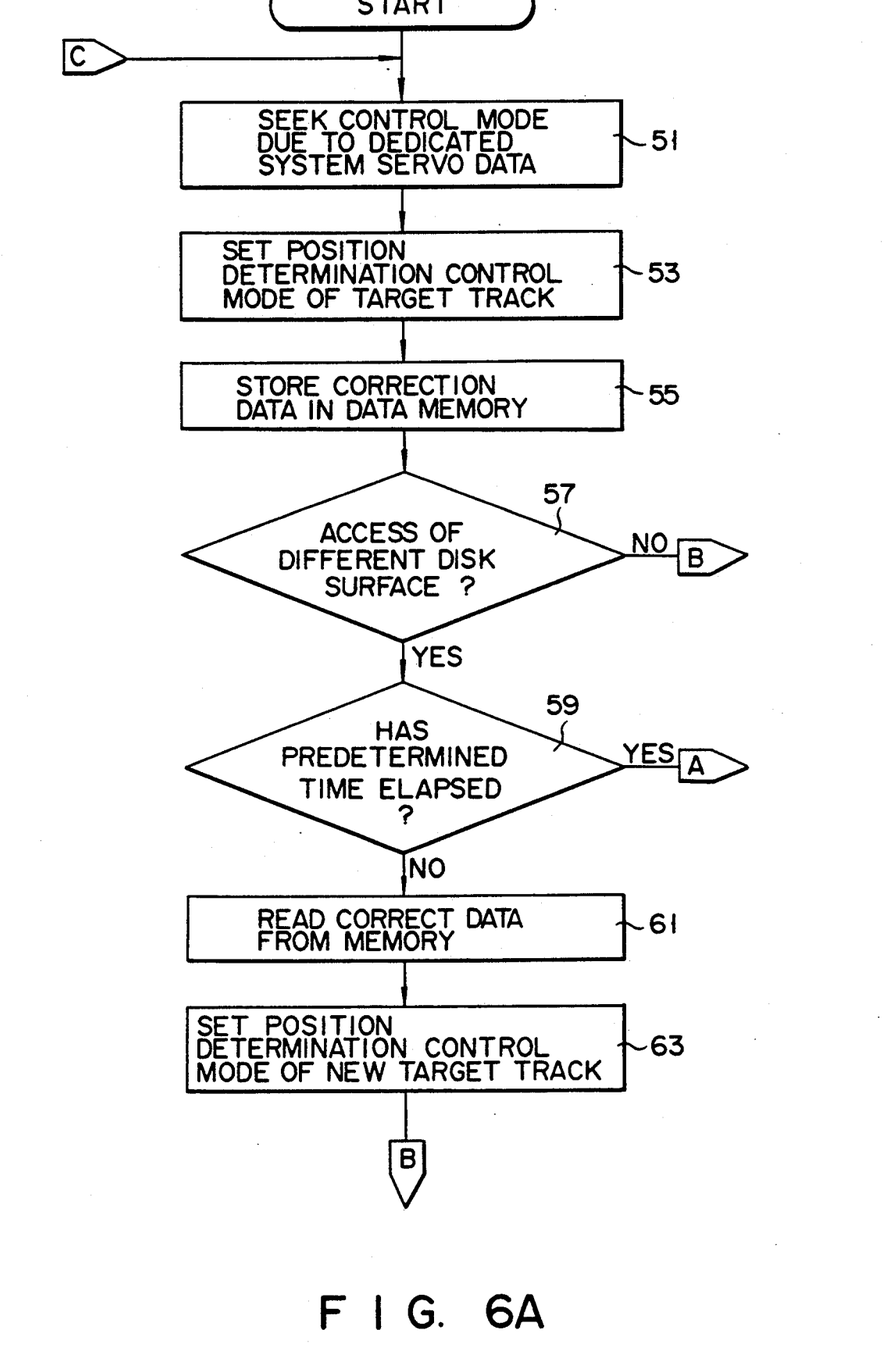
FIGS. 6A and 6B are flow charts for explaining an operation of another embodiment of the present invention.
Figure 6B:
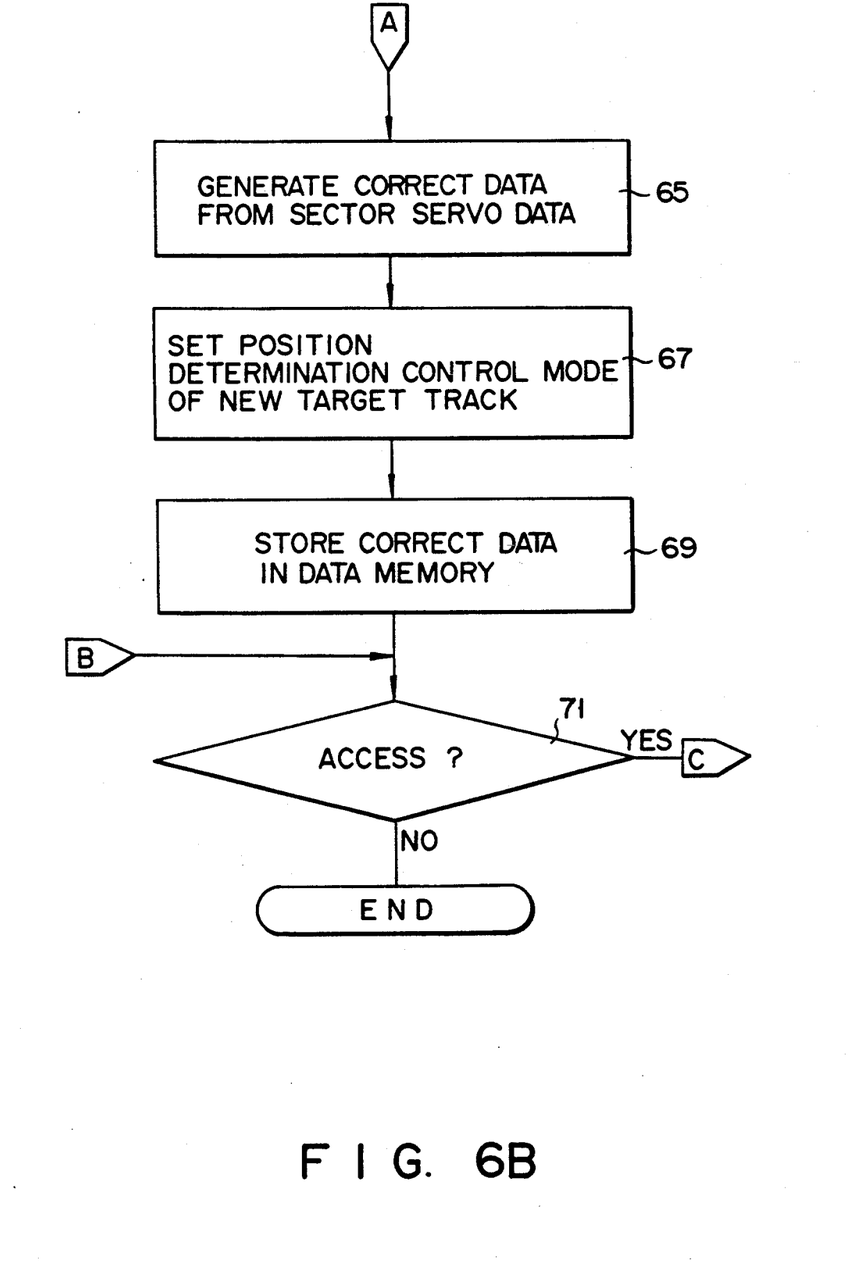

FIGS. 6A and 6B are flow charts showing an operation of another embodiment of the present invention.

When a target track (target cylinder) of a data surface 14 in/from which data is to be read/written is designated by the host computer (not shown), seek control of a corresponding data head 10 is started. In the seek control mode, a seek control mode of the servo head 11 is executed in accordance with dedicated servo system data recorded on the servo surface 15 in step 51 shown in FIG. 6A. More specifically, when dedicated servo data is read from the servo head 11, the dedicated servo system circuit 19 generates head position signal necessary for seek control and outputs it to the control circuit 17. The control circuit 17 controls the carriage driving mechanism 16 in accordance with the head position signal data from the dedicated servo system circuit 19 so as to move the carriage 12 in the radial direction of the recording media 13 at a predetermined speed. Upon this movement of the carriage 12, the servo head 11 seeks a target position corresponding to the target track. The corresponding data head 10 seeks the target track of the designated data surface 14 upon seeking of the servo head 11.

When the data head 10 is sought to the target track, the flow of operation is shifted to the position determination control mode for positioning the data head 10 on the center of the target track (step 53). In the position determination control mode, the sector servo system circuit 20 generates offset value data for positioning the data head 10 on the center of the target track on the basis of the sector servo system data read from the data head 10. The control circuit 17 controls the carriage driving mechanism 16 in accordance with the correction data from the sector servo system circuit 20 so as to perform position correction processing for executing fine movement control of the carriage 12. With this operation, the data head 10 is accurately positioned on the center of the target track of the designated data surface 15 upon seeking of the servo head 11. In this case, the positional correction processing includes correction processing for an offset due to a thermal offtrack state. The CPU 21 temporarily stores the offset value data generated by the sector servo system circuit 20 in the data memory 22 (step 55). The data head 10 performs a read/write operation of data with respect to the target track on which the data head 10 is positioned.

In this case, if an access is made to a different data surface, the CPU 21 checks whether a predetermined time has elapsed after the data surface 14 is previously accessed (steps 57 and 59). The predetermined time is a limit time within which a positioning error can be restricted within the allowable range by using previously generated correction data when a thermal offtrack phenomenon occurs due to a change in ambient temperature of the apparatus. If the predetermined time has not elapsed yet, the CPU 21 reads out offset value data corresponding to the previous data surface 14 and outputs it to the sector servo system circuit 20 (step 61). If no previous offset value data is generated in this case, the same operation as in the case wherein it is determined in step 59 that the predetermined time has elapsed is performed.

The sector servo system circuit 20 outputs the offset value data transferred from the CPU 21, as data for positioning the corresponding data head 10 on the center of the new target track, to the control circuit 17. Similar to the processing in step 53, the control circuit 17 performs positional correction processing for the data head 10 so as to position the data head 10 on the center of the new target track of the different data surface 14 on the basis of the offset value data from the sector servo system circuit 20 (step 63).

If YES in step 59, the CPU 21 does not read out the offset value data from the memory 22. For this reason, the sector servo system circuit 20 generates new offset value data based on sector servo system data read from the target data head 10 and outputs it to the control circuit 17 (step 65). The control circuit 17 performs positioning of the data head 10 on the center of the new target track on the basis of the newly generated offset value data (step 67). In other words, when an access is made after the predetermined time has elapsed, positional correction processing cannot be performed by using the offset value data stored in the memory 22, and hence it is determined that generation of new offset value data (update of offset value data) is required. The CPU 21 stores the newly generated offset value data in the memory 22 (step 69).

If an access is made to a new target track of the same data surface 14, seek control to the target track is started (step 71). In addition, the present invention may employ a system in which the sector servo system circuit 20 generates offset value data for each data surface 14 beforehand using the data heads 10 and stores it in the data memory 22 through the CPU 21 every time the hard disk unit is energized.

If offset value data is generated for each data surface 14 and is temporarily stored in the data memory, when the position determination control mode for a target track of an accessed data surface 14 is to be performed, corresponding offset value data stored in the data memory 22 can be used. The position determination control mode, therefore, does not require the process of reading sector servo system data from an accessed data surface 14 in each operation. For this reason, when data surface servo system data is sector servo data, the time required to read servo data corresponding to several sectors can be saved. Hence, the processing time for the position determination control mode can be shortened. Especially, when target tracks on the same cylinder of the data surfaces 14 are to be continuously accessed, the processing time for the position determination control mode can be shortened, and hence the access speed can be increased.

The above embodiment has been described by exemplifying a magnetic disk apparatus where the dedicated servo system and the data surface servo system are combined as the servo system. The present invention can also be applied to a magnetic disk apparatus where only the data surface servo system is used.

If an access is made when the predetermined time has elapsed after the generation of preceding offset value data, new offset value data is generated, and offset value data stored in the data memory 22 is updated. Therefore, even if an offset value corresponding to a thermal offtrack state changes with the lapse of time, positional correction processing can always be performed by using proper correction data.

What is claimed is:

1. An apparatus for recording/reproducing information, comprising:

a plurality of magnetic recording mediums, one surface of one of said plurality of magnetic recording mediums being a servo surface on which only servo data for magnetic head positioning determination is recorded, and the other surfaces of said magnetic recording mediums excluding the servo surface being data surfaces on which servo data is partly recorded and for recording data;

a servo head, provided corresponding to the servo surface, for reading out the servo data from the servo surface;

a plurality of data heads, provided corresponding to the respective data surfaces of the respective recording mediums, for reading from or writing data into the corresponding data surfaces;

carriage means for mounting said servo head and said data heads, and for moving said servo head and said data heads on said recording mediums;

seek control means for moving by said carriage means said data heads to the target track of the respective data surfaces of said corresponding recording mediums based on the servo data read out from the servo surface by said servo head;

position offset value detecting means for obtaining the respective position offset values with respect to the center of the target track of the respective data heads based on the servo data recorded on the data surfaces of said recording mediums in order to position to the respective center of the target track the respective data heads which are moved to the target track by said seek control means;

memory means for storing respective position correction data used for the position determination processing of said respective data heads based on the position offset values obtained by said position offset value detecting means;

position determination control means for positioning, in the center of the target track, by said carriage means, said data heads sought to the target track of the data surfaces, based on the position correction data corresponding to the respective data heads stored in said memory means;

determining means for determining whether a cylinder of a track on which a first of said data heads has been positioned is identical to a cylinder of a track on which a second of said data heads is to be positioned, when a data read/write operation for the data surface corresponding to the first data head is switched to a data read/write operation for the data surface corresponding to the second data heads; and control means for, when said determining means determines that the target tracks are located o the same cylinder, comparing the position correction data corresponding to first data head stored in said memory means with the position correction data corresponding to the second data head stored in said memory means, and for executing the data read/write operation by said second data head without executing the respective control operations by said seek control means and said position determination control means when an error as the comparison result falls within a predetermined allowable range.

2. An apparatus for recording/reproducing information, comprising:

a plurality of magnetic recording mediums, the respective surfaces thereof being data surfaces on which servo data being partly recorded and for recording recording data;

a plurality of data heads, provided corresponding to the respective data surfaces, for reading or writing data to the corresponding data surfaces;

carriage means for mounting said data heads and for moving said data heads on the recording mediums;

seek control means for moving, by said carriage means, the data heads to the target track of the respective data surfaces corresponding to said data heads based on the servo data read out from the data surfaces by said data heads;

position offset value detecting means for obtaining the respective offset values with respect to the center of the target track of said respective data heads based on the servo data recorded on the respective data surfaces, in order to position, in the center of the target track, said data heads sought to the target track of the data surfaces;

memory means for storing respective position correction data used for position determination processing of said respective data heads based on the position offset values obtained by said position offset value detecting means;

position determination control means for positioning, in the center of the target track, by said carriage means, said data heads sought to be target track of the data surfaces, based on the position correction data corresponding to the respective data heads stored in said memory means;

determining means for determining whether a cylinder of a track on which a first of said data heads has been positioned is identical to a cylinder of a track on which a second of said data heads is to be positioned, when a data read/write operation for the data surface corresponding to the first data magnetic head is switched to a data read/write operation for the data surface corresponding to the second data magnetic heads; and control means for, when said determining means determines that the target tracks are located on the same cylinder, comparing the position correction data corresponding to first data head stored in said memory means with the position correction data corresponding to the second data head stored in said memory means, and for executing the data read/write operation by said second data head without executing the respective control operations by said seek control means and said position determination control means when an error as the comparison result falls within a predetermined allowable range.

* * * * *